United States Patent
Bok et al.

(10) Patent No.: US 11,146,961 B2
(45) Date of Patent: Oct. 12, 2021

(54) THIRD PARTY CERTIFICATE MANAGEMENT FOR NATIVE MOBILE APPS AND INTERNET OF THINGS APPS

(71) Applicant: JPMorgan Chase Bank, N.A., New York, NY (US)

(72) Inventors: Reetu Raj Bok, Philadelphia, PA (US); William H. Johnston, Rehoboth Beach, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 36 days.

(21) Appl. No.: 16/808,472

(22) Filed: Mar. 4, 2020

(65) Prior Publication Data

US 2020/0288305 A1    Sep. 10, 2020

Related U.S. Application Data

(60) Provisional application No. 62/813,309, filed on Mar. 4, 2019.

(51) Int. Cl.
*H04L 9/32* (2006.01)
*H04W 12/30* (2021.01)

(52) U.S. Cl.
CPC ............ *H04W 12/35* (2021.01); *H04L 9/321* (2013.01); *H04L 9/3239* (2013.01); *H04L 9/3265* (2013.01)

(58) Field of Classification Search
CPC ...... H04W 12/35; H04L 9/321; H04L 9/3239; H04L 9/3265; H04L 63/0823; H04L 9/3263; H04L 9/3268; H04L 2209/38; H04L 2209/64; G06F 21/33
See application file for complete search history.

(56) References Cited

U.S. PATENT DOCUMENTS

| | | | |
|---|---|---|---|
| 10,708,256 B1* | 7/2020 | Kane-Parry | H04L 63/061 |
| 2002/0069174 A1* | 6/2002 | Fox | H04L 63/0869 705/52 |
| 2016/0094546 A1* | 3/2016 | Innes | G06F 21/33 713/156 |
| 2018/0109538 A1* | 4/2018 | Kumar | H04L 63/08 |
| 2018/0288062 A1* | 10/2018 | Goyal | H04L 63/1408 |
| 2019/0165950 A1* | 5/2019 | Ibrahim | H04W 4/60 |

* cited by examiner

*Primary Examiner* — Techane Gergiso
(74) *Attorney, Agent, or Firm* — Hunton Andrews Kurth LLP

(57) ABSTRACT

An embodiment of the present invention is directed to providing third party certificate management for native mobile apps or IoT apps. An embodiment of the present invention is directed to performing vendor certificate pinning for trusted communications in native mobile apps without having to control vendor certificate lifecycle management. With an embodiment of the present invention, downloaded certificates may be protected by encryption, anti-tampering protection, etc.

20 Claims, 2 Drawing Sheets

US 11,146,961 B2

THIRD PARTY CERTIFICATE MANAGEMENT FOR NATIVE MOBILE APPS AND INTERNET OF THINGS APPS

CROSS REFERENCE TO RELATED APPLICATIONS

The application claims priority to U.S. Provisional Application 62/813,309, filed Mar. 4, 2019, the contents of which are incorporated herein in its entirety.

FIELD OF THE INVENTION

The present invention relates generally to digital certificate management, and more particularly to a system and method for managing third party certificates in a native mobile application or internet of things (IoT) application.

BACKGROUND

Digital certificates may be used in the field of network communications by a client device to authenticate the identity of a remote host, allowing for secure, trusted communications. A host computer, such as a web server operated by a business, may issue a digital certificate that contains a public key, the identity of the entity which owns the certificate, and a digital signature of the issuer of the certificate. A client device, such as a mobile phone running a mobile application ("mobile app") or an IoT device running an IoT application ("IoT app"), may download the certificate and use it to verify the authenticity of communications with the remote host purporting to be the named entity. In encrypted network communications, such as communication with an HTTPS-based website, a digital certificate may be used to protect users against unauthorized access to their confidential information or other attacks from third parties.

In order to maintain a high level of information security, issuers and owners of digital certificates may require that the certificates expire after a defined time period and that they be changed periodically by the issuer. The lifespan, expiration, and updating of digital certificates are a part of digital certificate lifecycle management. In situations where one business operates and maintains both the mobile app or IoT app and the remote host (e.g., web server), that business can coordinate the updating of digital certificates so that the mobile app or IoT app is configured to receive and store the updated digital certificate from the web server. This process of associating a trusted host computer with a digital certificate is sometimes referred to as "pining" and may involve storing the public key of the digital certificate locally with the mobile app or IoT app to locally verify the identity of remote host before establishing trusted connection.

However, many mobile apps and IoT apps also communicate with remote hosts operated by third parties. For example, a mobile app or IoT apps operated and maintained by a financial institution may communicate with a remote host operated by a third party merchant. In this situation, the third party remote host updates its digital certificate according to its own certificate lifecycle management schedule. With no control over the certificate lifecycle management of such third party hosts, the mobile app or IoT app provider may face challenges in aligning the updates of third party certificates with updates of its mobile app or IoT app. This lack of control may introduce security vulnerabilities in the mobile app or IoT app. For example, dynamically updating certificates stored locally may cause the mobile app or IoT app to be vulnerable to man-in-the-middle attacks purporting to be a trusted third-party host. These and other problems are known in existing digital certification management schemes.

A need therefore exists to securely manage digital certificates of third party hosts in situations where the app owner does not have control over the third party certificate.

SUMMARY

According to one embodiment, the invention relates to a computer-implemented system and method for third party certificate management for a mobile app or IoT app connected to a communications network. The method may be executed on, for example, a mobile device executing a mobile app or an IoT device executing an IoT app. The mobile device or IoT device comprises one or more computer processors and electronic storage devices and operates over a communications network with a trusted gateway and a third party host. The trusted gateway may comprise, for example, a server operated by the same entity that operates the mobile app or IoT App.

According to one embodiment, a computer-implemented method provides third party certificate management for a mobile device connected to a communications network. The method comprises: sending, to a trusted gateway via the communications network, a request for a first certificate chain of a third party host; receiving, from the trusted gateway via the communications network, the first certificate chain of the third party host; storing the first certificate chain of the third party host; generating and storing a hash of the first certificate chain of the third party host; applying a protection to the hash; initiating communication with the third party host; downloading, from the third party host via the communications network, a second certificate chain of the third party host; generating a hash of the second certificate chain of the third party host and storing the hash locally; determining whether the hash of first certificate chain of the third party host matches the hash of second certificate chain of the third party host; and responsive to determining a match, establishing trusted communication with the third party host.

According to one embodiment, a computer-implemented system provides third party certificate management for a mobile device connected to a communications network. The system comprises: a mobile device executing a mobile application, and a trusted gateway comprising a computer server in communication with the mobile device over a communications network; the mobile device programmed to perform the steps of: sending, to the trusted gateway via the communications network, a request for a first certificate chain of a third party host; receiving, from the trusted gateway via the communications network, the first certificate chain of the third party host; storing the first certificate chain of the third party host; generating and storing a hash of the first certificate chain of the third party host; applying a protection to the hash; initiating communication with the third party host; downloading, from the third party host via the communications network, a second certificate chain of the third party host; generating a hash of the second certificate chain of the third party host and storing the hash locally; determining whether the hash of first certificate chain of the third party host matches the hash of second certificate chain of the third party host; and responsive to determining a match, establishing trusted communication with the third party host.

According to exemplary embodiments of the invention, additional protective measures applied to the hash may comprise, for example, encrypting the hash with a symmetric encryption key, adding the symmetric encryption key to the mobile device's keychain, and/or applying a root detection mechanism. The protective measures applied to the hash may further comprise white box encryption in case the device has no hardware security module. Whitebox cryptograph may be used to encrypt and decrypt the values in the hash as well as to perform the comparison with other locally generated hash values. The hash algorithm used may be SHA-2-based, or any other NIST approved hash function as desired.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
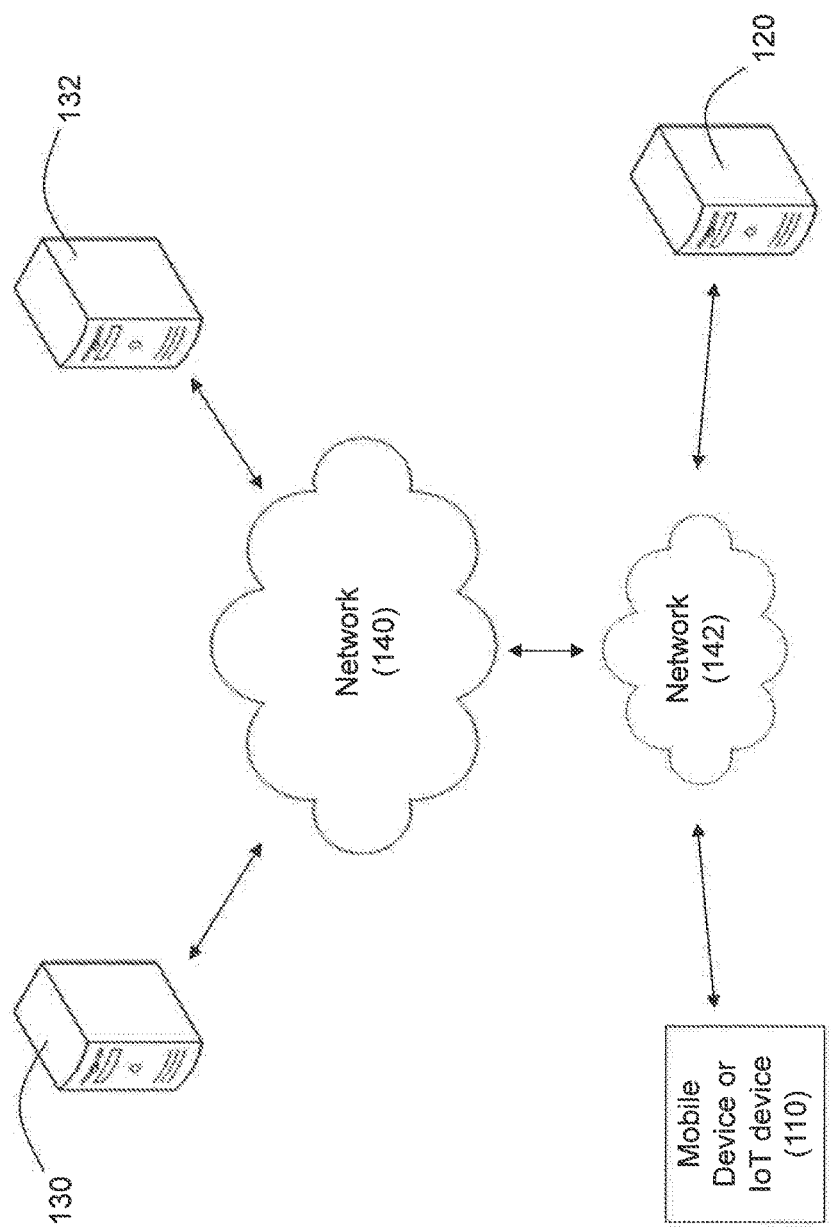
FIG. 1 is a diagram of a system for providing third party certificate management for native mobile apps or IoT apps, according to an exemplary embodiment of the invention.

FIG. 1 is a diagram of a system for providing third party certificate management for native mobile apps or IoT apps, according to an exemplary embodiment of the invention. The system of FIG. 1 may be used, for example, to implement the exemplary method illustrated in FIG. 2. An embodiment of the present invention is directed to performing vendor certificate pinning for trusted communications in native mobile apps without having to control vendor certificate lifecycle management. With an embodiment of the present invention, downloaded certificates may be protected by encryption, anti-tampering protection, etc.

As shown in FIG. 1, the system may include one or more computing devices, such as servers 120, 130, 132, and mobile device 110. Mobile device 110 may represent various devices including smart phones, personal devices, wearables, IoT devices, etc. The system may also include one or more networks 140, 142 that connect the various computing devices shown in FIG. 1. Although only one mobile device 110 and three servers 120, 130, 132 are shown in FIG. 1 to illustrate principles of the invention, in practice many mobile devices and servers will typically be involved in implementation of various embodiments of the invention. The networks may comprise, for example, any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The system may be operated by a business or other type of organization that operates and maintains a mobile app or IoT app for its customers, clients, members, and/or other users.

The certificate management system may be embodied primarily in a server, such as server 120, which operates as a trusted gateway, in combination with a mobile app or IoT app executing on one or more mobile devices or IoT devices 110 according to an exemplary embodiment of the invention. The server 120 may be owned and/or operated by the same business or other organization that owns (or is associated with) the mobile app or IoT app executing on the mobile device 110 according to a preferred embodiment of the invention. Other variations, architectures and/or configurations may be implemented.

Servers 130 and 132 may represent third party hosts to which the mobile device 110 may connect and/or communicate with. According to one example, server 130 may be operated by one third party merchant, and server 132 may be operated by another third party merchant. Exemplary embodiments of the invention may provide the third party certificate management service via the server 120 that facilitates secure authentication of certificates provided by servers 130 or 132 to mobile device 110.

Figure 2:
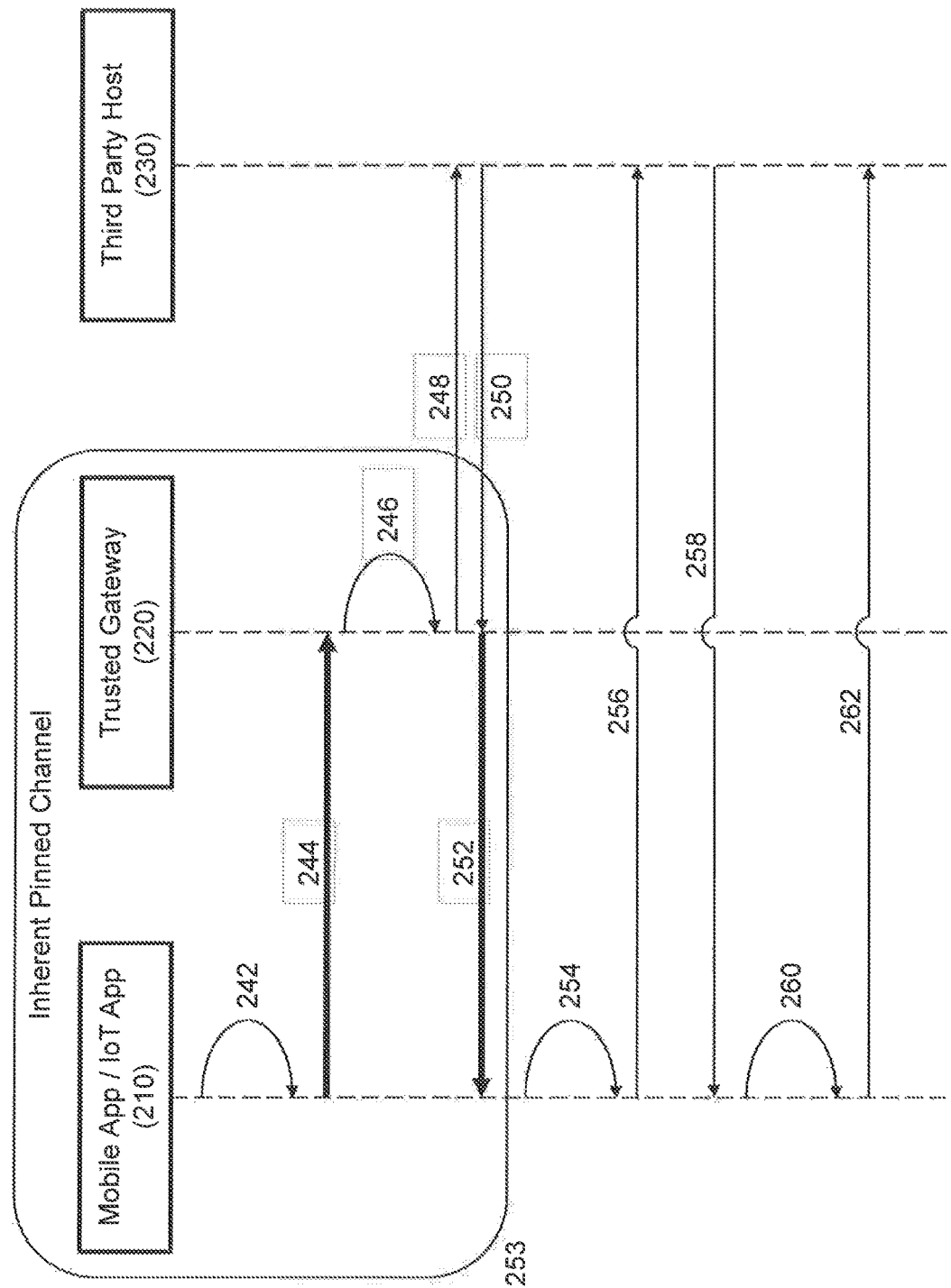
FIG. 2 is a diagram of a method for providing third party certificate management for native mobile apps or IoT apps, according to an exemplary embodiment of the invention.

FIG. 2 illustrates a diagram of a method for providing third party certificate management for native mobile apps or IoT apps, according to an exemplary embodiment of the invention. FIG. 2 illustrates interactions between mobile app/IoT app 210, trusted gateway 220 and third party host 230. Mobile app or IoT app 210 may represent an application executing on a mobile device, IoT device and/or other device. Trusted gateway 220 may be associated with a financial institution, entity, etc. Third party host 230 may represent an API based service that provides a response (e.g., data) to a request from the mobile device executing the mobile app or IoT app 210. Other intermediary devices and components may be implemented in accordance with various embodiments of the present invention.

In FIG. 2, a mobile app or IoT app 210 may securely store the digital certificates of third party host 230 during a binary building stage of the app and use it to pin the web service requests for trusted communications with third party host 230. As illustrated in FIG. 2, the mobile app or IoT app 210 may have a trusted communication channel with trusted gateway 220 due to preloaded certificates of trusted gateway 220 during compilation of the mobile or IoT app binary, wherein the mobile app or IoT app has pinned the certificate for the trusted gateway. Pinning refers to locally storing on the mobile device or in the mobile app or IoT app the certificate or the public key of the certificate and using that certificate to verify the identity of endpoint of communication channel in order to mitigate man-in-the-middle attacks. The thicker lines shown in steps 244 and 252 of FIG. 2 indicate trusted communications between the mobile app or IoT app 210 and the trusted gateway 220. The communication channel between the mobile app or IoT app and the trusted gateway may be considered to be trusted or secure because both are controlled by the same entity, and the channel is pinned with the trusted gateway certificate (e.g., an intermediate and leaf certificate or entire chain, etc.). This may be achieved by compiling the mobile application binary or IoT application binary with a locally stored certificate chain of the trusted gateway and using it to pin web service requests between the trusted gateway and the app or IoT device. In this example, trusted gateway 220 has control over life cycle management for its own certificates as used by the mobile app or IoT app 210 as well as by other infrastructure within the same entity.

According to one embodiment, in step 242, a mobile app or IoT app may determine that it needs to communicate with a third party host, for example to call a third party API, wherein the digital certificate (e.g., public SSL certificate, etc.) of that third party embedded in or stored with the mobile app or IoT app has expired, or the app has not yet acquired a digital certificate for that third party. In step 244, the mobile app or IoT app may send a request to the trusted gateway 220 to fetch the SSL certificate of a particular domain of a third party host. The request sent by the mobile app or IoT app 210 to the trusted gateway 220 may include the third party domain and requester app ID, which may be encrypted and signed so that trusted gateway may verify the request has come from a trusted device and/or trusted application.

In step 246, the trusted gateway 220 may validate the request from the mobile app or IoT app. Validation may include verifying that the requester app ID is registered with the trusted gateway as a verified app. Validation may also involve verifying that the third party domain is permitted (e.g., whitelisted, etc.) for use with the requester mobile app or IoT app. In step 248, the trusted gateway may request from the third party host, which has a validated third party domain, the third party host's certificate or certificate chain.

According to an exemplary scenario, the trusted gateway and the third party host may have root, single or multiple intermediate, and leaf in a certificate chain. For example, a certificate chain may represent an ordered list of certificates that enable a receiver to verify that the sender and corresponding certificates are trustworthy.

In step 250, the required certificate chain of the validated third party domain may be downloaded by the trusted gateway 220. In step 252, the validated certificate or certificate chain may be transmitted to the mobile app or IoT app 210.

As represented by 253, the interactions may be considered secure and/or trusted. Accordingly, the interactions of 253 may provide the basis to enable mobile app or IoT app 210 to securely connect and/or request as well as receive information from third party host 230.

In step 254, the mobile app or IoT app may store the certificate chain locally and generate and store a hash of the certificate chain in a separate local file. In one embodiment, the hash generated at step 254 may be generated using a hash function, such as an SHA-2 based hash function, or other NIST approved hash function. Step 254 may also include applying one or more additional protective measures to the file that stores the hash. For example, in one embodiment, the one or more forms of protection on the hash generated in step 254 may include: obfuscating the content of the hash; implementing anti-tamper control on the hash; encrypting the hash, storing the symmetric encryption key in the local device's keychain, and applying a root detection mechanism on the app; and performing encryption on the hash using white box cryptography in case of the absence of a hardware security module on the device. A root detection technique may be used, for example, to determine whether the device on which the mobile app or IoT app is running has been rooted or not. Encryption key rotation and change mechanisms may also be applied based on the criticality of the features associated with the third party host. Variations and other forms of protection may be applied.

In step 256, the mobile app or IoT app may request data through a third party API by initiating a connection, such as an HTTPS connection, with the third party host 230. This may involve requesting the third party host's certificate (e.g., public SSL certificate, etc.), certificate chain and/or other form of certificate. In step 258, the mobile app or IoT app 210 may receive the certificate or certificate chain from the third party host 230. In step 260, the mobile app or IoT app may generate and compare the hash (e.g., SHA2 hash, etc.) of the certificate chain received from the third party host with the locally stored hash (at step 254) of the third party's certificate chain received from the trusted gateway 220 in step 252. Upon a successful match, step 260 may proceed with the mobile app or IoT app comparing the entire certificate chain with the certificate chain stored locally in step 254. And, upon a successful match, a trusted communication may be established with third party host by pinning the communication with stored certificate chain from step 254.

In one embodiment, some or all of the logic controlling the mobile app's or IoT app's operations may be obfuscated. Obfuscation may be performed using an app code obfuscation service, such as a code obfuscation service provided by third-party vendors, such as Metaphoric, etc. Obfuscation generally refers to the process of adding non-substantive information to a file to make reverse engineering more difficult. In one embodiment, the obfuscation may involve adding non-substantive information to computer code during the process of compiling object code for the mobile app or IoT app, which hinders reverse engineering the mobile app or IoT app object code to produce the source code. According to one embodiment, the logic performed by the mobile app or IoT app, such as in steps 242, 244, 254, and/or 260, may be obfuscated to enhance the security of the system by increasing the difficulty of reverse engineering the object code to obtain the source code. According to one embodiment, the mobile app or IoT app may perform anti-tampering logic, wherein any altering of the code or any file of the mobile application's binary or IoT application's binary may be detected and cause the mobile application or IoT application not to run. Variations and other forms of protection may be applied.

According to one embodiment, to ensure that the file with the list of hashes in step 254 (e.g., SHA2 hashes, etc.) has not been changed maliciously, the file's hash may be calculated after every genuine update and then stored in the keychain after obfuscating the hash string and applying a root detection mechanism. Whitebox cryptography may be used as well. In critical cases, a hash of the file (storing the list of hashes in step 254) may be validated with a backend system of the trusted gateway as well, which stores the hash for each device.

According to one embodiment, the stored hash of the third party certificate stored locally by the mobile app or IoT app may be validated with the trusted gateway. This additional step may be performed at any time after generating the hash at step 254.

Embodiments of the invention may provide advantages by allowing a mobile app or IoT app to manage third party certificates securely. Those skilled in the art will appreciate the embodiments discussed above provide enhanced security both for external attacks, for example a man-in-the-middle attack, and for internal attacks, for example from malicious code on a rooted device.

Those skilled in the art will appreciate that the system diagrams discussed above are merely examples of a third party certificate management system configuration and are not intended to be limiting. Other types and configurations of networks, servers, databases, mobile devices, and personal computing devices (e.g., desktop computers, tablet computers, mobile computing devices, smart phones, etc.) may be used with exemplary embodiments of the invention. Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Data and information maintained by the servers and computing devices shown in FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

The communications networks in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, an Asynchronous Transfer Mode (ATM) connection, a Fiber Distributed Data Interface (FDDI) connection, a Copper Distributed Data Interface (CDDI) connection, or an optical/DWDM network.

The communications networks in FIG. 1 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Bluetooth radio link, or an IEEE 802.11-based radio frequency link. The communications network may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, the communication network may comprise a Personal Branch Exchange (PBX), which may further connect to the PSTN.

Although examples of servers 120, 130, and 132, and mobile device 110 are shown in FIG. 1, exemplary embodiments of the invention may utilize other types of communication devices whereby a user may interact with a network that transmits and delivers data and information used by the various systems and methods described herein. The servers and mobile device may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device may also include a network-enabled appliance or another TCP/IP client or other device. The mobile device 110 may include various connections such as a cell phone connection, WiFi connection, Bluetooth connection, satellite network connection, and/or near field communication (NFC) connection, for example.

As described above, FIG. 1 includes a number of computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and mobile device in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the mobile device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for providing third party certificate management for a mobile device connected to a communications network, the method comprising:
    sending, to a trusted gateway via the communications network, a request for a first certificate chain of a third party host;
    receiving, from the trusted gateway via the communications network, the first certificate chain of the third party host;
    storing the first certificate chain of the third party host;
    generating and storing a hash of the first certificate chain of the third party host;
    applying a protection to the hash;
    initiating communication with the third party host;
    downloading, from the third party host via the communications network, a second certificate chain of the third party host;
    generating a hash of the second certificate chain of the third party host and storing the hash locally;
    determining whether the hash of first certificate chain of the third party host matches the hash of second certificate chain of the third party host; and
    responsive to determining a match, establishing trusted communication with the third party host.

2. The method of claim 1, wherein the mobile device comprises an Internet of Things (IoT) device.

3. The method of claim 1, wherein the request comprises a third party host domain and an identifier.

4. The method of claim 1, wherein the hash is stored in a separate file from the first certificate chain of the third party host.

5. The method of claim 1, wherein the protection comprises obfuscating at least a portion of the hash.

6. The method of claim 1, wherein the protection comprises applying anti-tamper logic to at least a portion of the hash.

7. The method of claim 1, further comprising the step of: pinning the established communication to the third party host with the first certificate chain of the third party host.

8. The method of claim 1, wherein the step of applying a protection to the hash further comprises: encrypting the hash with a symmetric encryption key, storing the symmetric encryption key in a local keychain, and applying a root detection mechanism.

9. The method of claim 1, wherein the step of applying a protection to the hash further comprises performing white box cryptography on the hash.

10. The method of claim 1, wherein the hashes are generated according to an SHA-2 based hash function.

11. A computer-implemented system for providing third party certificate management for a mobile device connected to a communications network, the system comprising:
    a mobile device executing a mobile application, and
    a trusted gateway comprising a computer server in communication with the mobile device over a communications network;
    the mobile device programmed to perform the steps of:
    sending, to the trusted gateway via the communications network, a request for a first certificate chain of a third party host;

receiving, from the trusted gateway via the communications network, the first certificate chain of the third party host;

storing the first certificate chain of the third party host;

generating and storing a hash of the first certificate chain of the third party host;

applying a protection to the hash;

initiating communication with the third party host;

downloading, from the third party host via the communications network, a second certificate chain of the third party host;

generating a hash of the second certificate chain of the third party host and storing the hash locally;

determining whether the hash of first certificate chain of the third party host matches the hash of second certificate chain of the third party host; and responsive to determining a match, establishing trusted communication with the third party host.

12. The system of claim 11, wherein the mobile device comprises an Internet of Things (IoT) device.

13. The system of claim 11, wherein the request comprises a third party host domain and an identifier.

14. The system of claim 11, wherein the hash is stored in a separate file from the first certificate chain of the third party host.

15. The system of claim 11, wherein the protection comprises obfuscating at least a portion of the hash.

16. The system of claim 11, wherein the protection comprises applying anti-tamper logic to at least a portion of the hash.

17. The system of claim 11, wherein the mobile device is further programmed to perform the step of: pinning the established communication to the third party host with the first certificate chain of the third party host.

18. The system of claim 11, wherein applying a protection to the hash further comprises: encrypting the hash with a symmetric encryption key, storing the symmetric encryption key in a local keychain, and applying a root detection mechanism.

19. The system of claim 11, wherein applying a protection to the hash further comprises performing white box cryptography on the hash.

20. The system of claim 11, wherein the hashes are generated according to an SHA-2 based hash function.

* * * * *